United States Patent

Hay et al.

Patent Number: 5,950,261
Date of Patent: Sep. 14, 1999

[54] INFANT WRAP

[76] Inventors: Sandra Hay, 2100 Irving Ave. South, Minneapolis, Minn. 55405; Roberta Herman, 1400 Lincoln Ave. South, Minneapolis, Minn. 55403

[21] Appl. No.: 09/020,161

[22] Filed: Feb. 7, 1998

[51] Int. Cl.⁶ ........................................... A47G 9/02
[52] U.S. Cl. .................... 5/482; 5/494; 5/655; 2/69; 297/219.12
[58] Field of Search ................ 2/69, 69.5, 413 R; 5/482, 494, 413 R, 655, 502, 484; 297/219.12

[56] References Cited

U.S. PATENT DOCUMENTS

| | | | |
|---|---|---|---|
| 4,616,365 | 10/1986 | Lyons | 2/69 |
| 4,897,885 | 2/1990 | Lunt | 2/69.5 |
| 4,993,090 | 2/1991 | Ranalli | 5/482 |
| 5,046,204 | 9/1991 | Mohler | 5/494 X |
| 5,432,965 | 7/1995 | Espinoza | 5/482 |
| 5,611,095 | 3/1997 | Schneider | 5/482 |
| 5,722,094 | 3/1998 | Ruefer | 2/69 X |

FOREIGN PATENT DOCUMENTS

| | | | |
|---|---|---|---|
| 2153662A | 8/1985 | United Kingdom | 5/413 R |
| 93025102 | 12/1993 | WIPO | 2/69 |

*Primary Examiner*—Michael F. Trettel
*Attorney, Agent, or Firm*—D. L. Tschida

[57] ABSTRACT

A blanket wrap tailored to mount to a car seat or infant carrier. Safety restraints at the support mount through the wrap to permit attachment of the straps to the infant or toddler prior to fitting the wrap to the infant. An integral cushioned pad is centered to the wrap and fasteners are arrayed about the wrap to assure a snug fitting, once the infant is strapped to the seat or carrier. A hood and sleeves can be provided at the wrap.

6 Claims, 6 Drawing Sheets

INFANT WRAP

BACKGROUND OF THE INVENTION

The present invention relates to baby blankets and, in particular, to an infant wrap or blanket which accommodates seat belt restraints at a stroller, baby jogger, car seat and or infant carrier to assure infant comfort, as safety is maintained. The wrap is particularly designed to accommodate three and five point fastenings.

Varieties of covers, wraps, comforters and blankets have been developed to contain and warm infants and toddlers. Contoured, insulated outer garments also exist, such as snowsuits and which typically have sleeves, legs and or a hood. The wraps can be used alone or may be used in combination with an insulated outer garment. Alone or together, the wraps maintain an infant's warmth as the infant or toddler is supported in a carrier, for example, a swing, stroller, infant seat, or car seat. In such circumstances, the child is typically bundled in the wrap, with the edges of the wrap loosely drawn around the infant. The two, in turn, are mounted in the carrier. Safety straps at the carrier may or may not be fastened around the covered child, depending upon the difficulties of securing the straps over the blanket and around the shoulders, waist and or between the infant's crotch to contain the infant to the carrier. The attachment of the straps and safety of the infant can also be compromised, depending upon the vehicle and the ability of the carrier to accommodate available seat belts.

Known wraps generally consist of a blanket or flat sheet article which fits around an infant. A quilted or soft insulated material is frequently used to insulate the infant. Fasteners may be secured to the edge of the blanket to receive carrier straps, reference U.S. Pat. No. 5,243,724.

Wraps are also known which include pockets or attachments that permit the mounting of a cushion or pad to a primary blanket. U.S. Pat. No. 5,551,108 discloses a contoured foam rubber pad that is retained within a pocket and over which a portion of the blanket can be folded to cover an infant supported in a depression of the cushion.

U.S. Pat. No. 4,993,090 discloses a blanket wrap having apertures that receive safety straps that extend from an infant carrier.

Some infant carriers also include covers that have slots that allow safety straps to protrude through the cover. U.S. Pat. Nos. 4,761,032 and 5,309,586 disclose two such carriers.

Although the foregoing covers and wrap can cushion and warm an infant, unless tailored to a specific infant carrier, car seat or support appliance, they may not optimally support and restrain the child as suggested by the carrier manufacturer. The present invention was therefore developed to provide an infant wrap that is compatible with a wide range of infant carriers and car seats and that includes an integral cushioned pad. The wrap accommodates three and five point strap fastener systems. The wrap also includes fasteners that retain the wrap to the infant, independent of the support appliance.

SUMMARY OF THE INVENTION

It is accordingly a primary object of the invention to provide a blanket wrap that includes a number of apertures and through which restraint straps from an infant carrier or vehicle can extend.

It is a further object of the invention to provide a wrap having a permanently sewn or detachable padded cushion and wherein restraint straps can be fitted through the wrap.

It is a further object of the invention to provide a wrap having mating fasteners distributed over the wrap to securely retain the wrap to the infant.

It is a further object of the invention to provide a wrap having a hood and or sleeves that are secured to the peripheral edges of the wrap.

Various of the foregoing objects, advantages and distinctions of the invention are obtained in a presently preferred wrap that is constructed from a fleece fabric and which includes a padded cushion fitted to the wrap. Fasteners are separately arrayed over the body of the wrap to securely and snuggly retain the wrap to an infant in much the same fashion as a contoured outer garment. Multiple, hemmed apertures are provided at the central region of the wrap and a cushioned pad to accept safety restraints threaded through the apertures. The wrapped infant can thereby be secured with available safety straps to a supporting car seat or infant carrier and or to a transport vehicle. The wrap may include a hood and or sleeves.

Still other objects, advantages and distinctions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

DESCRIPTION OF THE PREFERRED EMBODIMENT

Figure 1:
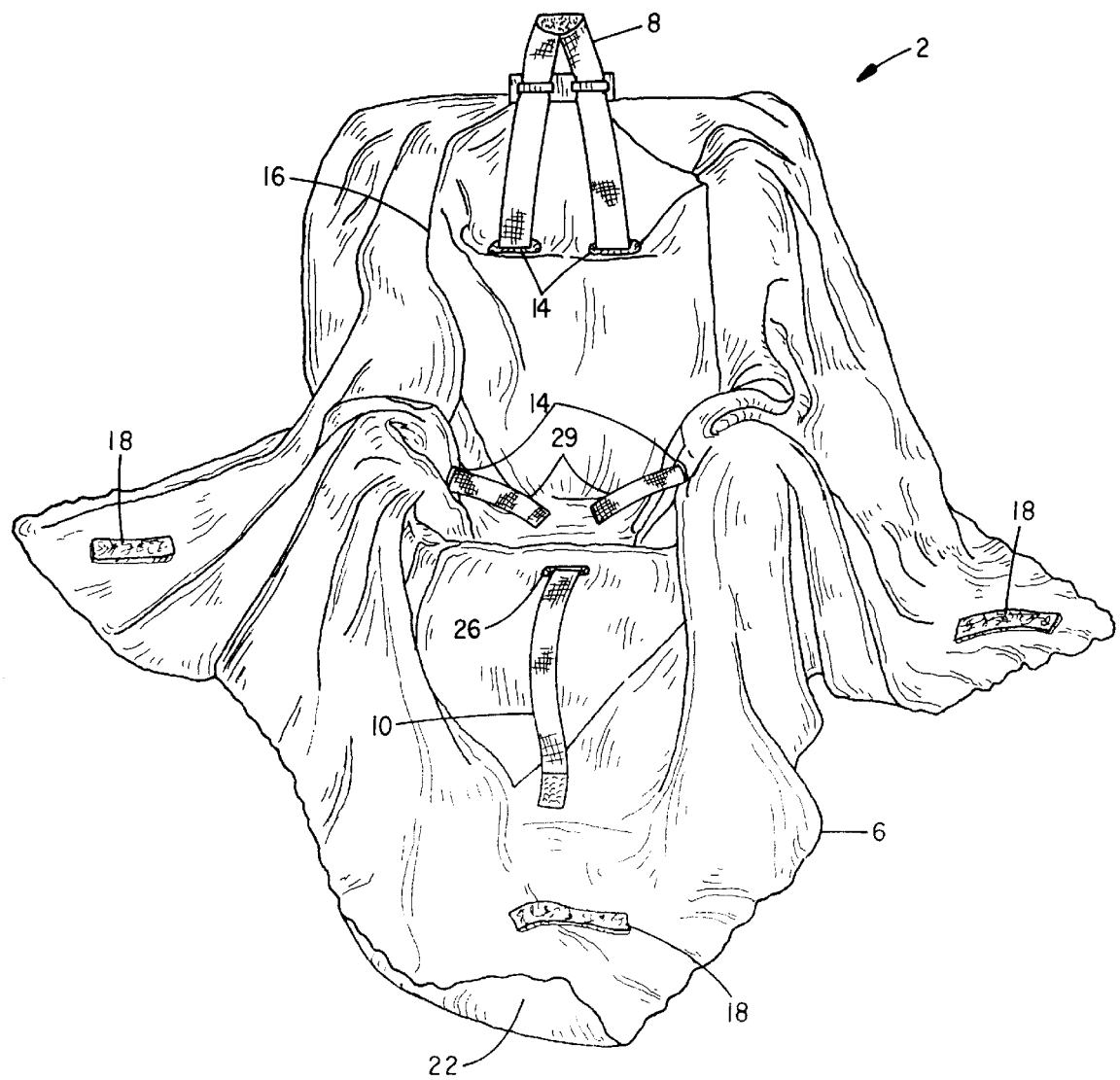
FIG. 1 is a perspective drawing showing a infant wrap of the invention fitted to a car seat.
Figure 2:
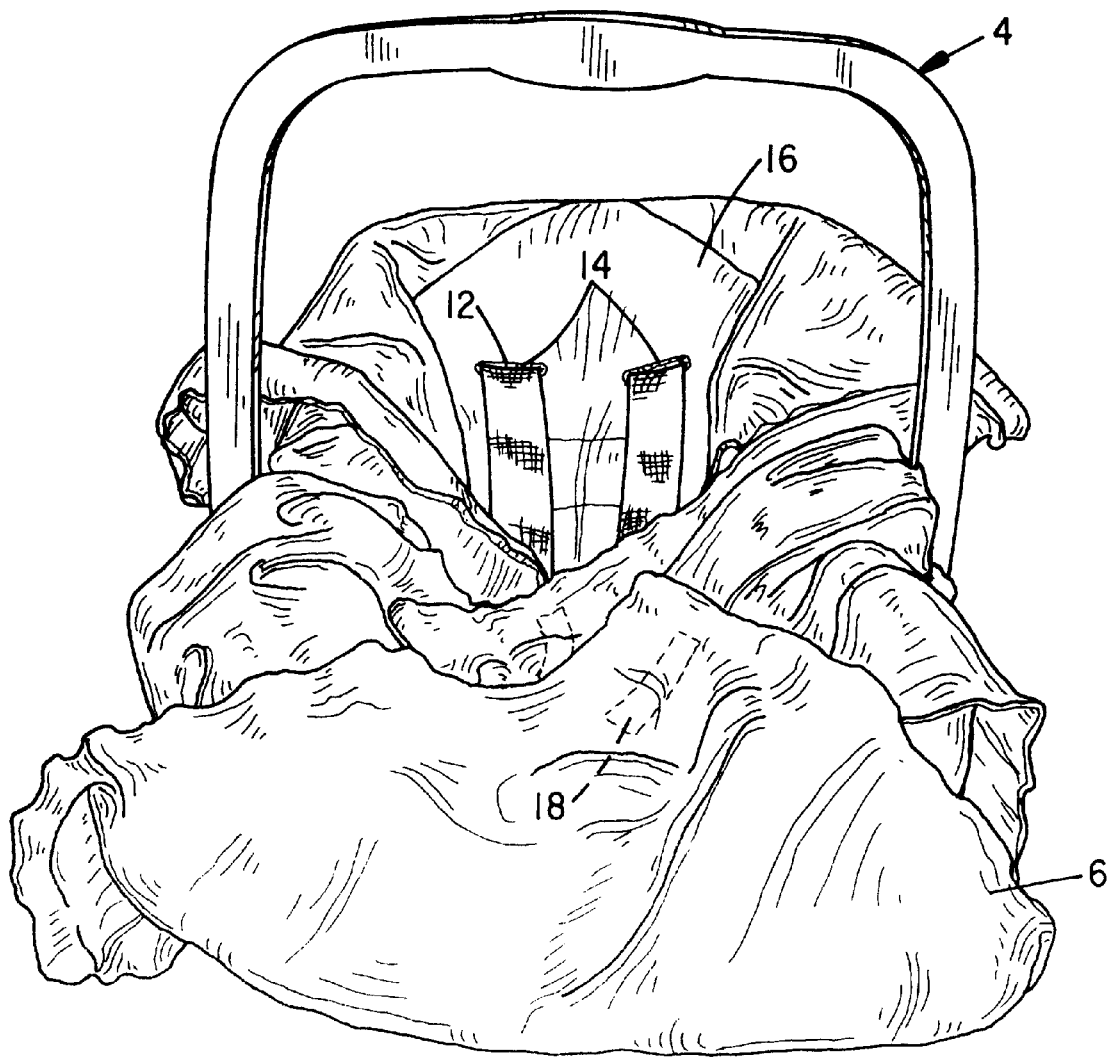
FIG. 2 is a perspective drawing showing the infant wrap folded partially closed.

Referring to FIGS. 1 and 2, perspective drawings are respectively shown to an infant car seat 2 and an infant carrier 4 and each of which are outfitted with the improved infant wrap 6 of the invention. The wrap 6 is shown folded open in FIG. 1 and folded closed in FIG. 2. Restraint straps 8, 10 and 12 at the seat 2 and carrier 4 extend through apertures 14 which are provided in a cushioned pad 16 at the wrap 6. The apertures 14 permit the wrap 6 to be attached to the restraint straps 8, 10 and 12 at the seat 2 and carrier 4, prior to securing the infant into the seat 2 and carrier 4. The wrap thereby does not interfere with the restraining of the infant to the hard shell of the seat or carrier. Depending upon the seat 2 or carrier 4, the apertures 14 can also accommodate safety straps provided at a transport vehicle, such as an automobile.

With the infant secured in place, the wrap 6 is closely fitted around the infant. The wrap 6 is held in place with a number of hook and loop and fasteners 18 that are appropriately distributed around the outer surface of the wrap 6. The orientation and placement of the fasteners 18 can be varied to accommodate the shape of the wrap 6. As the wrap 6 is drawn around the infant, the fasteners 18 are overlapped to retain the wrap 6 to the infant. With certain materials, such as the present fleece, pads of hook fasteners 18 may only be required to assure an adequate fastening. That is, the surface of some fleece materials can replace the mating pads of looped fastener material 18. The hook fasteners 18 can thereby be attached and released anywhere at the surface material of the body 20 of the wrap 6.

Figure 3:
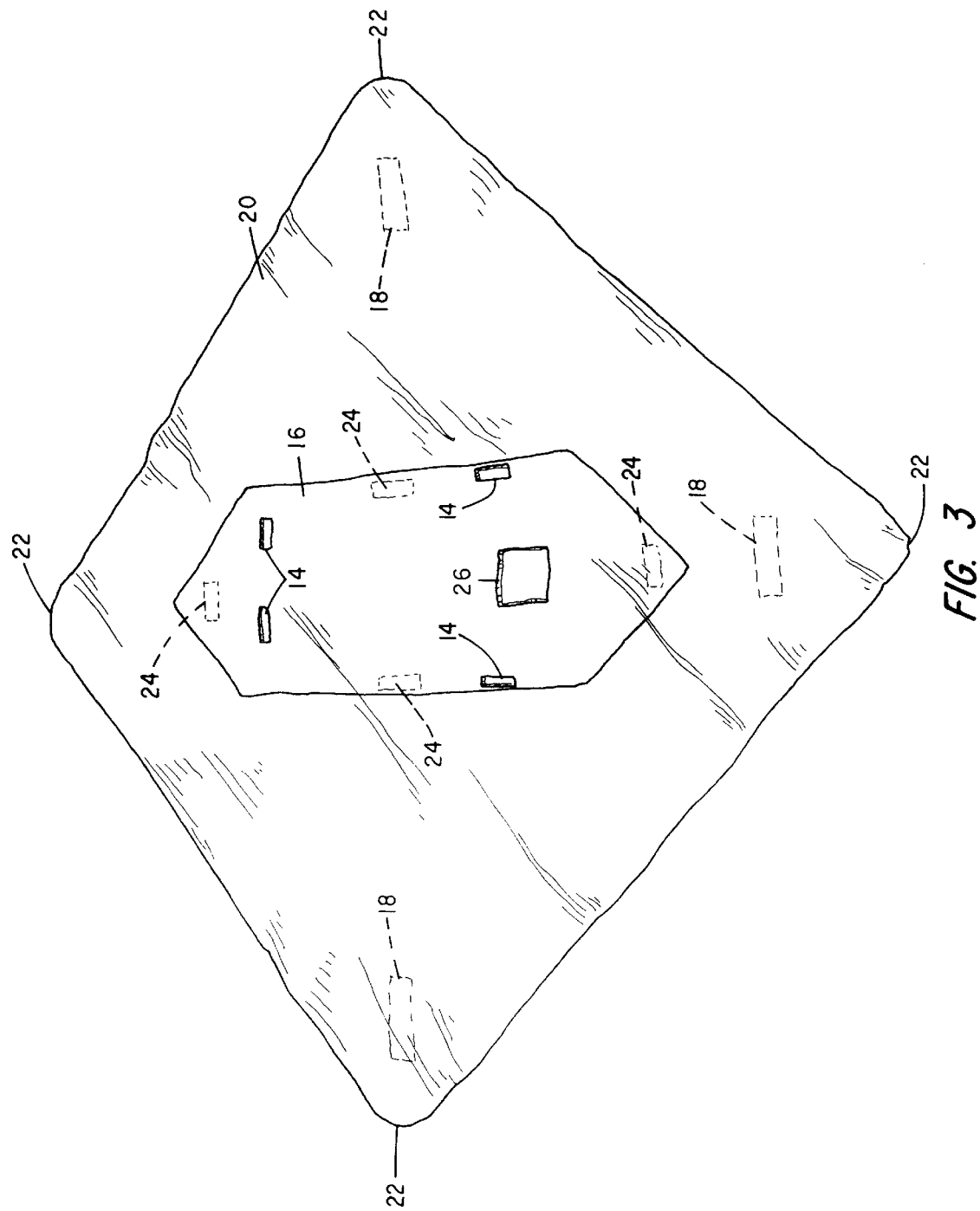
FIG. 3 is a plan view of the infant wrap of FIG. 1 as it appears when laid flat.

With additional attention to FIG. 3, the body 20 of the wrap 6 is fabricated from a soft fleece material, e.g. POLAR FLEECE is presently preferred, although a variety of other cotton, polyester or blanket materials can be substituted. The pad 16 is sewn into the center of the body 20 to provide multiple layers of material. The pad 16 is aligned to the body 20 such that the diagonal corners 22 can be wrapped over the infant. Alternatively, portions of the body 20 can be constructed to include sleeves and or a hood, reference FIG. 4. In the latter instance, the pad 16 may also be deleted.

Preferably, the pad 16 is constructed to provide additional thickness. The pad 16 is intended to insulate the infant and cushion the infant at the pressure points, where the infant is in contact with the hard shell of the seat 2 and or carrier 4. A variety of materials can be used to form the pad 16, for example, batted quilting materials, multiple and or thicker layers of fleece or other fabric materials, fabric covered core materials 17 (e.g. foam) and or elastomer pads.

Figure 4:
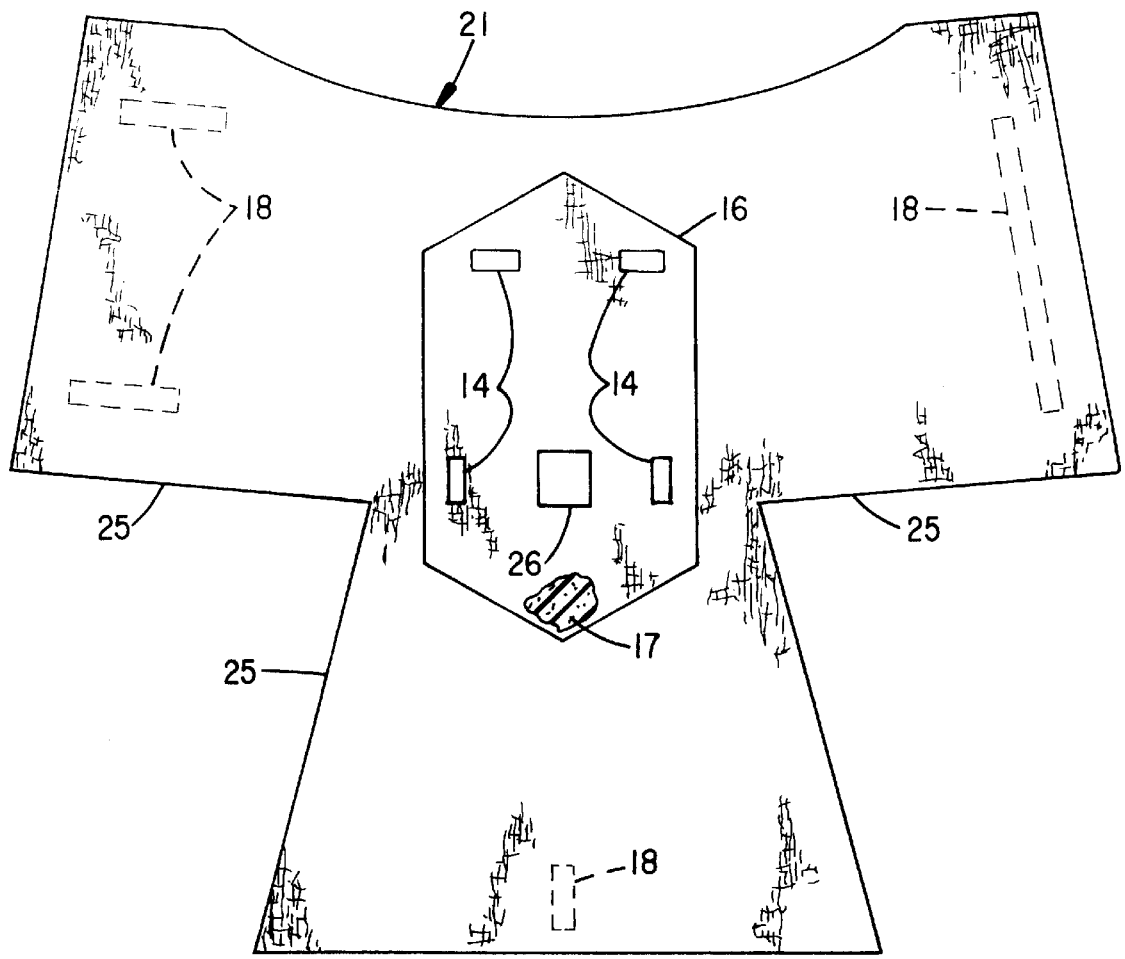
FIG. 4 is a plan view of an "angel wing" infant wrap.
Figure 5:
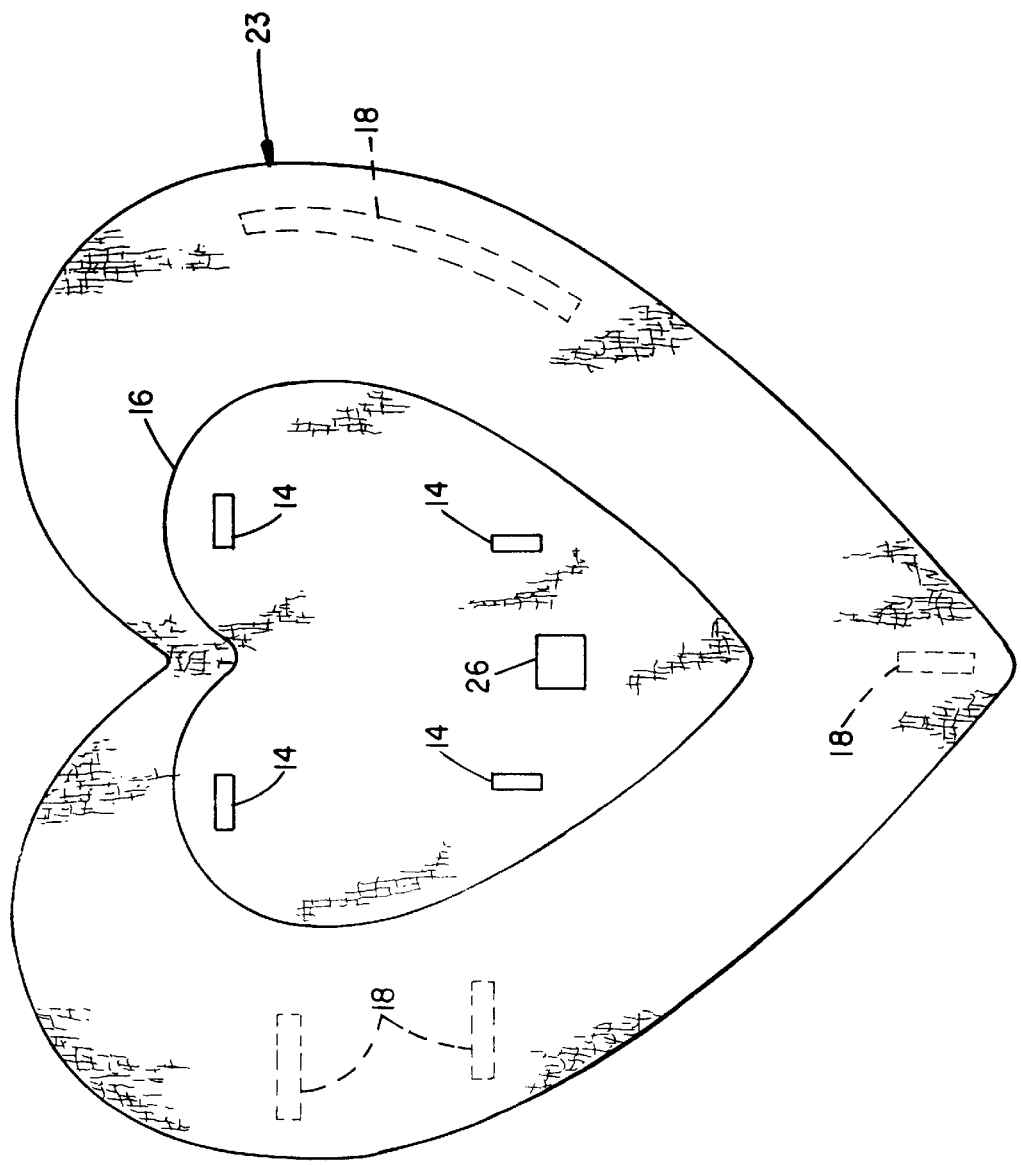
FIG. 5 is a plan view of a heart shaped infant wrap.

The body 20 and or pad 16 may also be constructed to a variety of shapes, e.g. animals, hearts, stars etc.. An angel wing shaped wrap 21 is shown at FIG. 4 and a heart shaped wrap 23 is shown at FIG. 5. The angel wing wrap 21 provides three wings 25 that fold to overlap each other and provided fasteners 18. Similarly the right and left sides and bottom of the heart wrap 23 fold to overlap each other and the provided fasteners 18. The position of the pad 16 may be varied over the body 20 of the wraps 6, 21, 23 and 25 to best cooperate with the overlapping portions. The relative sizes of the pad 16 and body 20 are sized in relation to the seat 2 or carrier 4.

Although the pad 16 is preferably sewn in place, the pad 16 can be secured to the body 20 with separate fasteners 24, and exemplary ones of which are shown in dashed line at FIG. 3. In such a construction, separately hemmed apertures 14 in the pad 16 and body 20 are mounted to align to one another. The apertures 14 are located and positioned to accommodate typical configurations of straps at the seat 2 or carrier 4. The aperture 26 at the crotch is preferably oversized to allow for some freedom of movement at the legs and which is important when fitting the infant to the seat 2 or carrier 4. The shape and size of the apertures 14 and 26 can be cut as necessary. Nominally, the apertures 14 are 2 to 4 inches long to accommodate the webbing width of the restraints 8, 10 and 12. The aperture 26 is cut to a rectangular shape of a comparable length and a width that also accommodates the restraints. Each of the apertures 14 and 26 is also preferably hemmed with to minimize possible wear and tear from the restraints 8, 10 and 12.

Figure 6:
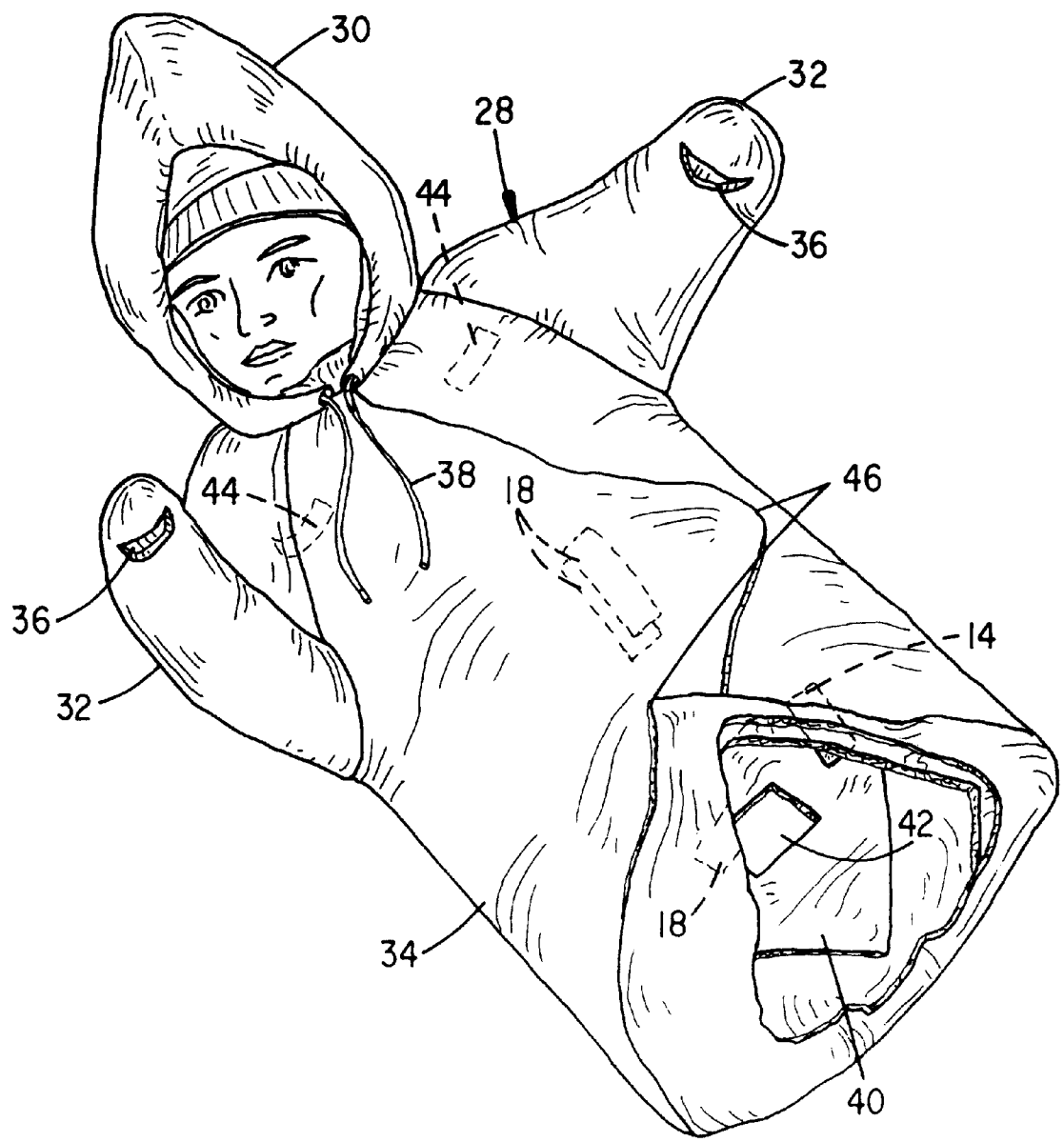
FIG. 6 is a perspective drawing shown in partial cutaway to a wrap that includes sleeves and a hood.

With attention to FIG. 6, a perspective drawings is shown in partial cutaway to a wrap 28 having a hood 30 and sleeves 32 fitted to a body 34. Hand openings 36 may be included in the sleeves 32 as desired. It is preferred that the hood 30 and sleeves be permanently sewn to the body 34, although mating fasteners 18 might be provided at overlapping edges to permit the detachment of one from the other. The hood 30 may also include a drawstring 38. A pad 40 is centered at the wrap 28 and includes a number of apertures 42 and 44. The apertures 42 and 44 are arrayed over the pad 40 to accommodate strap restraints at the seat 2 or carrier 4. The pad 40 may be detachably secured to the back of the body 34 to facilitate mounting the wrap 28 to the seat 2 or carrier 4.

In normal circumstances, the wrap 28 is first mounted to the seat 2 or carrier 4. The infant is positioned on the wrap 28 and the infant's head and arms are fitted into the hood 30 and sleeves 32. The corners 46 of the wrap 28 are drawn over the infant to overlap each other. Mating fasteners 18 arrayed to the wrap 28 are aligned and fastened. The bottom corner 46 is lastly drawn into place to tightly position the hood 30 and sleeves 32 to the infant. Possible leg and or feet pockets are thus not preferred, since they can interfere with the mounting of the wrap 28.

While the invention has been described with respect to various presently preferred constructions, still other constructions may be suggested to those skilled in the art. The foregoing description should be construed to include all those embodiments within the spirit and scope of the following claims.

What is claimed is:

1. A wrap for an infant carrier including restraint straps comprising:

a) a blanket formed from a first fabric panel having a rectilinear shape and four corners, wherein first and second displaced apertures are disposed adjacent a first corner, wherein a third aperture medial said first and second apertures is disposed adjacent a second corner diagonally opposite the first corner and, and wherein fourth and fifth apertures intermediate the first and second and third apertures, wherein the apertures are aligned such that first and second shoulder straps can be trained through said first and second apertures, a crotch strap can be trained through said third aperture and first and second waist straps can be trained through said fourth and fifth apertures; and c) a plurality of pads of mating hook and loop fastener material secured to a plurality of said corners, whereby said blanket mounts to a carrier with the first and second corners aligned to head and foot ends and the third and fourth corners aligned to lateral sides and an infant can be situated on said blanket and secured to the carrier with said shoulder, waist and crotch straps prior to being covered with said blanket.

2. A wrap as set forth in claim 1 wherein said a cushioned pad is secured to a center region of the blanket and the apertures are distributed over said pad.

3. A wrap as set forth in claim 2 wherein said pad comprises a covered foam.

4. An infant carrier including restraint straps and a wrap comprising:

a) a blanket formed from a first fabric panel having a rectilinear shape and four corners;

b) a second fabric panel secured to a center region of the first panel, wherein first and second displaced apertures are disposed in said second panel adjacent a first corner, wherein a third aperture medial said first and second apertures is disposed in said second panel adjacent a second corner diagonally opposite the first corner and, and wherein fourth and fifth apertures are disposed in said second panel intermediate the first and second and third apertures, and wherein first and second shoulder straps are trained through said first and second apertures, a crotch strap is trained through said third aperture and first and second waist straps are trained through said fourth and fifth apertures; and c) a plurality of pads of mating hook and loop fastener material secured to a plurality of said corners, whereby an infant can be situated on said blanket and secured to the carrier with said shoulder, waist and crotch straps prior to being covered with said blanket.

5. A wrap as set forth in claim 4 wherein said second panel comprises a fabric covered foam.

6. A wrap as set forth in claim 4 including a hood at said first corner and first and second tubular sleeves respectively secured to the blanket between said first and third corners and said first and fourth corners.

\* \* \* \* \*